Jan. 13, 1970  KARL-GUNTER GORSLER ET AL  3,488,930
COMBINE DETACHABLE HEADER

Filed Nov. 9, 1967                               4 Sheets-Sheet 1

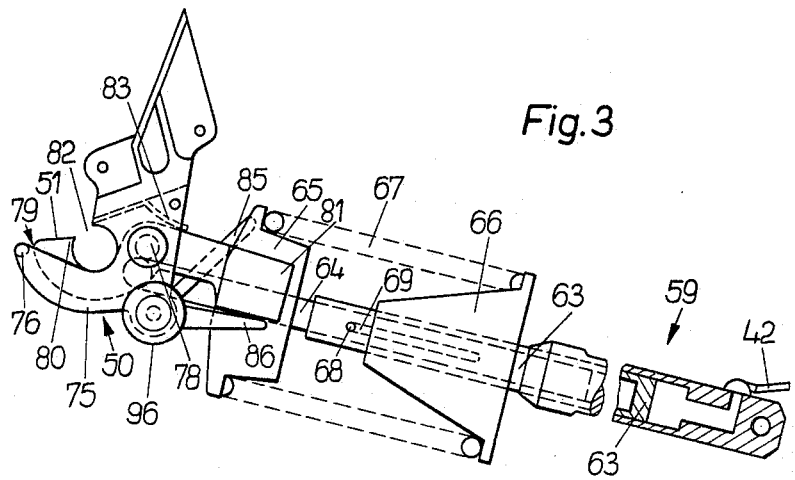
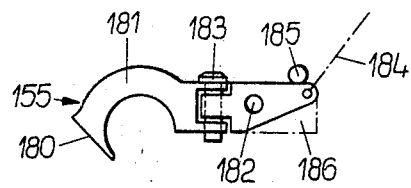
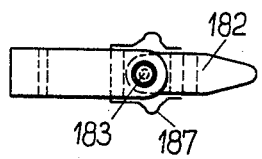
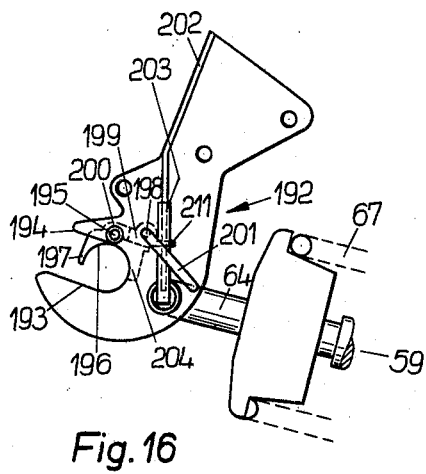
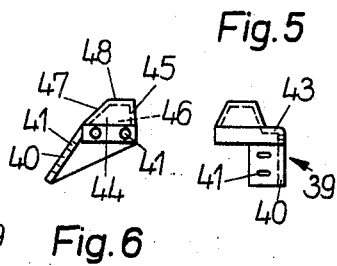

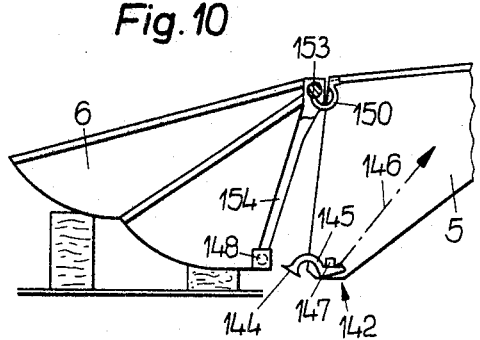
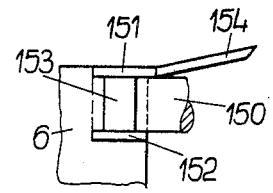
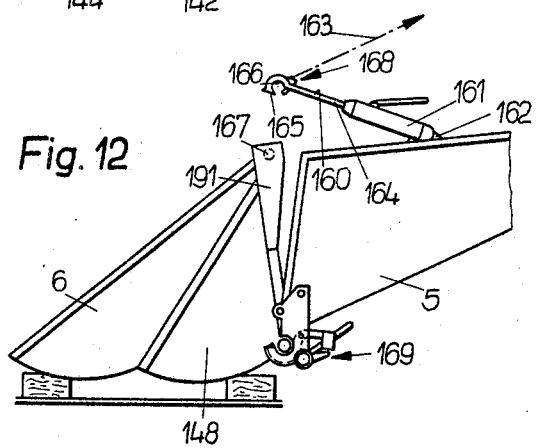
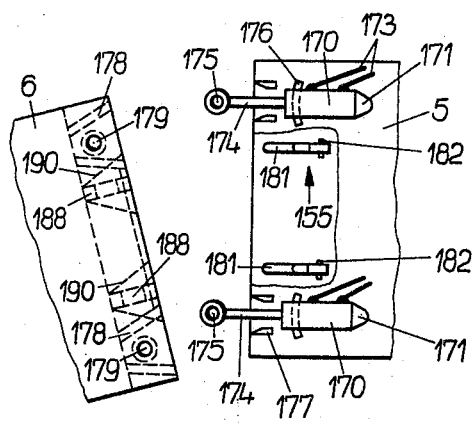

United States Patent Office 3,488,930
Patented Jan. 13, 1970

3,488,930
COMBINE DETACHABLE HEADER
Karl-Gunter Gorsler, Schwarzenacher, Joachim Mierswa, Weinheim, Claus-Dieter Heine, Bierbach, and Peter Sartorius and Bernhard Feldmann, Mannheim, Germany, assignors to Deere & Company, Moline, Ill., a corporation of Delaware
Filed Nov. 9, 1967, Ser. No. 681,796
Claims priority, application Germany, Nov. 19, 1966, D 51,593
Int. Cl. A01d 41/02
U.S. Cl. 56—2                                    10 Claims

ABSTRACT OF THE DISCLOSURE

A mounting and dismounting arrangement of grain combine headers and other crop-handling and crop-treating units with respect to the forward supporting structure or feeder house of a typical agricultural combine so as to improve the flexibility of the basic chassis structure as a self-propelled vehicle capable of performing a wide variety of agricultural functions.

BACKGROUND OF THE INVENTION

Field of the invention

As already indicated, the invention is an improvement in that class of machines including self-propelled agricultural combines and crop-treating and crop-handling components thereof incidental to the harvesting of grain, corn et cetera. In many geographical areas, it is impossible to transport large combines on narrow roads unless the header is removed and towed by the combine in longitudinal trailing relationship. In cases where there are several fields to be combined, this necessitates the removal and remounting of the header quite frequently, and it is therefore desirable that the means for accomplishing the dismounting and remounting be simply constructed and easily operated. In other instances, the header or other unit may be removed and replaced with other units, and it is desirable that all units have complementary mounting and dismounting means so that the interchange may be simply and easily effected.

Description of the prior art

The U.S. patent to Rohweder 3,270,489 (corresponding to Canadian Patent 753,417) is a good example of a simple and efficient means for accomplishing mounting and dismounting of the character noted. One of the features of the Rohweder construction is that the feeder house, which is conventionally capable of vertical adjustment, is used to pick up the temporarily dismounted header or other unit by its top, the raising movement of the feeder house being continued so that the bottom portion of the header, when freed from its temporary support, will swing rearwardly toward the bottom of the feeder house so that appropriate connections can be made. That construction solves most of the problems and features a construction involving speed and ease of mounting and dismounting the header and/or other unit and the ability of the mounting and dismounting system to accommodate a wide variety of such headers and other units.

SUMMARY OF THE INVENTION

The present invention provides significant improvements over the Rohweder construction, particularly since it includes automatic coupling means, the ability of the coupling means to be adjusted to accommodate misalinement between the feeder house and the temporarily dismounted and supported header, and further includes power-operated devices for accomplishing the mounting and dismounting operation in a simple and facile manner, together with other features that will appear as a disclosure is made of several embodiments of the invention.

BRIEF DESCRIPTION OF THE DRAWINGS

FIG. 3 is a side elevation, on the scale of FIG. 2 and partly in section, of a bottom coupling device including a gripping hook with a pressure cylinder and weight-balancing spring;

FIG. 5 is an enlarged front elevation of a left-hand receiving coupling on the feeder house;

FIG. 6 is a side elevation corresponding to FIG. 5;

FIG. 10 illustrates a third example of means for connecting a header to the feeder house, having top gripping hooks constructed as carrying elements;

FIG. 11 is an enlarged fragmentary view of a coupling member as provided with guide surfaces at the rear of the header;

FIG. 12 is a side view showing a fourth example of means for connecting a header to the feeder house, having a hydraulic coupling hook constructed as a connecting element;

FIG. 13 is a fragmentary plan view illustrating a fifth example of means for connecting a header to the feeder house, including horizontally swingable carrying elements;

FIG. 14 is an enlarged side elevation of a laterally and vertically swingable coupling hook as illustrated in FIG. 13;

FIG. 15 is a plan view corresponding to FIG. 14; and

FIG. 16 illustrates another example of means for connecting a header to the feeder house, with a locking catch movably mounted in the carrying elements.

DESCRIPTION OF THE PREFERRED EMBODIMENT

Figure 1:
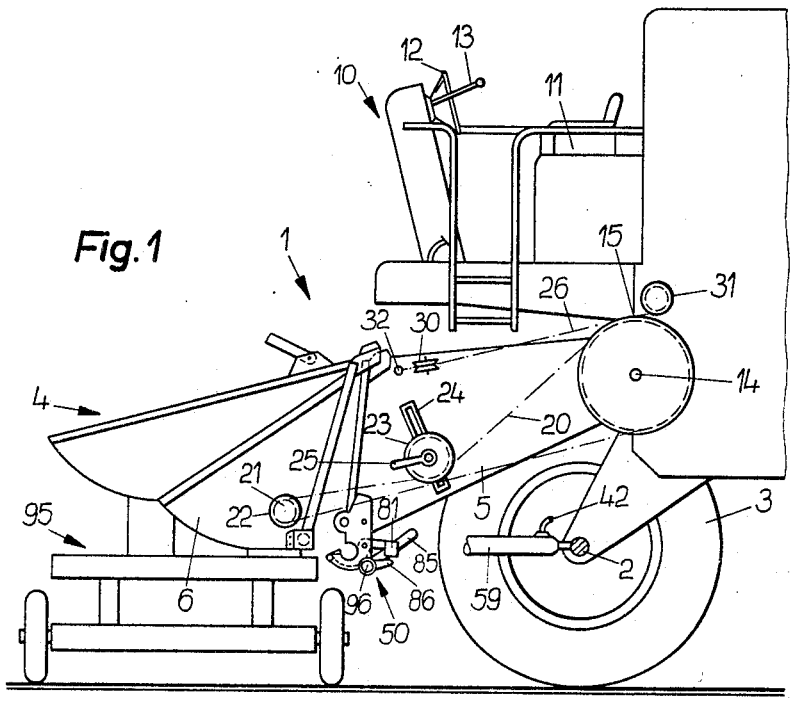
FIG. 1 is a side elevation of the forward part of a combine, with its header temporarily supported on a transport vehicle and awaiting coupling to the feeder house of the combine.

In FIG. 1, the numeral 1 designates the diagrammatically illustrated front part of a mobile unit, here shown as a combine, and the numeral 2 designates a driving axle on which the traction wheels 3 are mounted, only the far wheel being shown. The combine has a forward mounted unit 4, here a typical grain header, mounted on a typical feeder house or support 5. The machine has the usual driver's station 10, including a seat 11, a steering wheel 12 and an operating lever 13 for hydraulic control means, to be described later.

Coaxial with the usual transverse axis on which the feeder house 5 is pivoted to the combine body is a drive shaft 14 having fixed thereto a drive pulley 15 drivingly connected by a V-belt 20 to a V-belt pulley 22 on a shaft 21 on the header 4 for driving the usual cutting mechanism, auger et cetera (not shown). The V-belt 20 may be tensioned by a roller 23 slidably mounted on a bracket 24 on the outer side wall of the feeder house and secured by clamping means 25. The outer wall of the feeder house also carries a guide roller 30 for an operating cable 26 for the variable-speed reel drive (not shown), and another guide roller 31 is provided on the outside of the combine body. The operating cable extends from the operator's station 10 and has at its opposite end a hook 32 for detachable connections to an extension cable (not shown) for the above drive.

Figure 2:
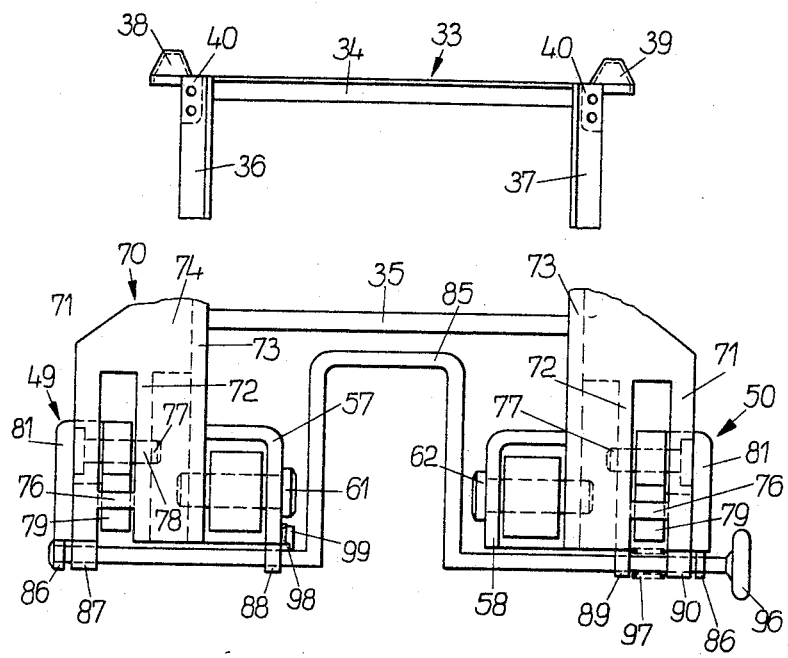
FIG. 2 is an enlarged front elevation, with portions broken away, of the structure mounting the coupling devices at the top and bottom of the front side of the structure mounted on the feeder house.

As illustrated in FIG. 2, the feeder house 5 is provided at its open front end with a rigid mounting structure or frame 33 which embraces the usual crop-receiving opening and having top and bottom members 34 and 35 rigidly connected by vertical members 36 and 37. At the top of the frame are mounted a pair of upstanding connector elements or receiving bases 38 and 39 of pyramidal configuration, preferably detachably and adjustably connected by means of bolts or the like to the members 36 and 37 respectively, the bases 38 and 39 each having a flange 40 provided with holes or slots 41 for the bolts. The flange 40 is connected through an integral part 43 to its base 38 or 39, and each base comprises inclined side surfaces or walls 44, 45, 46 and 47 and a closed top 48. The front wall 47 forms with the horizontal plane an angle of, for example, between 30° and 70°, and the junctions between the side walls 44–47 and the top 48 are rounded.

At the bottom of the frame 33 of the feeder house 5 (FIG. 2), gripping hooks 49 and 50 are carried on the members 36 and 37 respectively, these hooks being constructed as coupling elements detachably connected by means of bolts or the like to the members 35 and 36. On their inner sides, the gripping hooks 49 and 50 have L-shaped arms 57 and 58 respectively, each of these arms being open at the bottom and constructed as bearings for receiving the forward end of a power operated device including a hydraulic cylinder 59 for achieving vertical adjustment of the feeder house and header units. As illustrated in FIG. 3, the cylinders 59 are typically pressurized and depressurized by a hydraulic line 42 and their front ends are pivotally connected to the feeder house by bearing pins 61 and 62 respectively, disposed in the arms 57 and 58 (FIG. 2), and their rear ends are pivotally connected to the driving axle 2 as is generally conventional. Each cylinder 59 carries a piston 63 in which a rod 64 is slidably mounted. The piston 63 and its rod 64 are secured together against complete separation by a cross pin 68, and, in order to permit longitudinal displacement of the rod 64 in the piston 63, while preventing complete relaxation of a weight-balancing spring 67 disposed on the rod 64 and piston 63 between spring cups 65 and 66, the cross pin runs in and is limited by a guide slot 69 in the rod 64. In assembly, the weight-balancing spring 67 is preferably pre-stressed over about two-thirds of its length, in order to ensure, for example, that, when the header 4 is removed, the feeder house 5 will not completely spring upwardly and make it difficult to couple and uncouple the header.

Each of the gripping hooks 49 and 50 is constructed is an M-shaped part 70 (FIG. 2) open at the bottom, the individual arms 71, 72 and 73 being connected by a horizontal plate 74. Each of the arms 71 and 72, which forms the actual gripping part 75 (FIG. 3) of the gripping hook 49 or 50, is provided at its front end with a connecting part 76. Between the arms 71 and 72, there is provided a bearing pin 78, secured by means of a cotter 77 and on which a locking catch 79 is rockably mounted. The locking catch 79 comprises a front gripping hook 80 provided with a guide surface 51 and a counterweight 81. The gripping hooks 49 and 50 or the gripping part 75 form together with the gripping hook 80 of the locking catch 79, in the locking position, a circular locking recess which at the top is interrupted by an opening 82. The counterweight 81 tends to turn the hook in a clockwise direction and thus to hold the locking catch 79 in its locking position. In order to prevent the catch 79 from swinging in a counterclockwise direction when the combine starts to operate, the catch is held by a spring 83 disposed on the respective hook 49 or 50. Rocking movement of the locking catches 79 in a clockwise direction is limited by eccentrics 86 fixed to opposite ends of a cranked rod 85, guided in bearing eyes 87–90 on the gripping hooks 49 and 50. In order, for example, during the operation of coupling the header 4 to the feeder house 5, to be able to bring a transport vehicle 95 as close as possible to the feeder house, for the purpose of carrying the header, the rod 85 is cranked in its middle portion. In this manner the running wheels of the transport vehicle 95 can be accommodated beneath the feeder house 5.

The rod 85, together with its eccentrics 86, can be turned in a clockwise or counterclockwise direction, for which purpose the rod 85 is controlled by an adjusting knob 96 on its outer end, acting against a coil spring 97 disposed between the bearing eyes 89 and 90. The rod 85 can be secured by means of a stop 98 disposed on the arm 57 and a catch pin 99 fastened on the rod and engageable with the stop. On uncoupling, the locking catches 79 can be turned by means of the rod 85 in a counterclockwise direction and against the pressure of the springs 83 until the eccentrics 86 bear against the counterweights 81, the locking catches 79 turning about their bearings until the coupling members on the header are freed. In order to introduce a coupling member into the gripping recess, the eccentric 86 does not need to be turned, but insertion takes place automatically as the coupling member presses against the guide surfaces 51 of the gripping hooks 80, whereby the locking catches 79 are moved downwardly until the openings 82 have been enlarged to such an extent that the coupling members can slip into the respective gripping recesses. As soon as the coupling members are in the gripping recesses, the locking catches 79 swing back automatically and prevent separation.

Like the feeder house 5, the header 4 has rigid on its rear wall or face a stabilizing frame 100 (FIG. 4) which embraces the crop-transfer opening and which comprises a pair of vertical members 105, which in cross-section are of angular, U-shaped or Z-shaped construction and which become associated with the opposite side walls of the feeder house 5, upon coupling of the header to the feeder house, so as to overlap with the members 36 and 37 and thus effect sealing means. The frame 100 also includes horizontal members 107 and 108, disposed respectively to mate with the top and bottom of the feeder house 5 and which are welded or bolted to the vertical header members 105.

Figures 4, 7, 8:
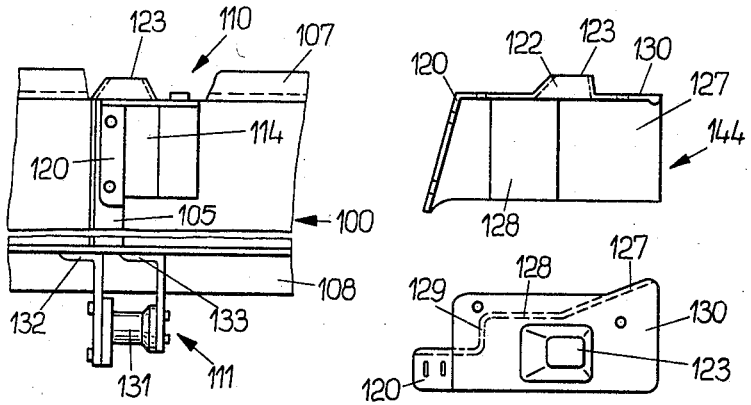
FIG. 4 is a rear view, on the scale of FIGS. 2 and 3 and with parts broken away, of the right-hand top and bottom of the rear side of the header.
FIG. 7 is a side elevation of a receiving pocket on the header.
FIG. 8 is a plan view corresponding to FIG. 7.

For the purpose of positive connection to the feeder house, the header is likewise provided with upper and lower coupling elements 110 and 111, the top ones of which cooperate with the receiving bases 38 and 39 respectively on the feeder house 5, being constructed as inverted pyramidal gripping pockets 114. As illustrated in FIGS. 4, 7 and 8, the gripping pockets are, for example, bolted by flanges 120 thereon to the vertical members 105 and to the upper horizontal member 107. The pockets 114 are essentially formed in each case by a receiving part 122 which is in the form of a truncated pyramid and which has the same angles of inclination as the receiving bases 38 and 39. In order to enable the operator of the combine to watch the coupling operation from his driving position, the receiving part 122 has an open top 123 so that the operator can ascertain when, as the header and feeder house are brought together, the receiving bases 38 and 39 have engaged completely beneath the respective receiving parts 122 on the header.

In addition, each of the receiving pockets 114 has a lateral guide or slide surface 127 which may form an angle of between 5° and 30° with the longitudinal centerline of the combine. At the end of the guide surface 127 are disposed a connecting part 128, extending parallel to the direction of travel, and an offset part 129 also extending in the direction of travel, these parts in turn being joined by an intermediate part and the part 129 merging into the flange 120. A horizontal plate 130, which is rounded at its outer receiving end, connects the guide surface 127 and the parts 128 and 129 to the receiving part 122.

At the bottom of the header frame or structure 100, there are situated the lower coupling elements 111, provided here as matching parts for the gripping hooks 49 and 50, for which purpose the coupling elements 111 are constructed as horizontally disposed bearing pins 131, connected to the lower horizontal member 108 of the header frame by means of supports 132 and 133. For the purpose of compensating for inaccuracy in manufacture, the bearing pins 131 are preferably mounted with vertical adjustability in the supports 132 and 133 and secured therein by suitable clamping screws.

The operation of uncoupling the header from the feeder house 5 takes place as follows: The V-belt 20 is first removed from the header pulley 22 by suitably backing off the tensioning roller 23. In addition, the operating cable 26 is disconnected at the hook 32. After the locking catches 79 have been swung downwardly, that is to say out of the gripping parts 75 of the hooks 49 and 50, by means of the rod 85, the operator can, from the operator's station 10, operate the lever 13 for the usual hydraulic valve (not shown) that is connected to the cylinders 59 and thus can exhaust the cylinders 59 so that the feeder house descends by its own weight. When the header engages and is supported on the transport vehicle 95, the pyramidal bases 38 and 39 on the feeder house structure 33 withdraw from the pockets 114 and at the same time the bearing pins 131 on the lower part of the header structure 100 are released from the gripping hooks 49 and 50 on the lower part of the feeder house 5. The rear wall or face of the header, which has been deposited on the transport vehicle 95 as stated above, which is advantageously provided with a suitable receiving trough, assumes an angle less than 90° to the horizontal.

The operation of coupling the header to the feeder house is effected in the reverse sequence: The locking catches 79 are still in their open positions, in which they were left after the previous uncoupling operation, and are held in that position by the eccentrics 86. The combine 1 is driven by the operator up to the header as supported on the vehicle 95, so that the pyramidal bases 38 and 39 on the feeder house first make contact with the gripping pockets 114 from below; that is to say, the guide surfaces 127 of said pockets serve to aline the cooperative parts. In this manner, the header can be alined in relation to the front face of the feeder house while the combine moves up slowly, so that the receiving bases 38 and 39 will come into vertical alinement with the gripping pockets. After the header rear wall or face thus becomes parallel to the front face of the feeder house by means of the cooperation between the pockets and the receiving bases 38 and 39, the combine can be driven still closer to the header so that the inclined surfaces 47 of the bases 38 and 39 slide past the round portions of the plates 130 of the gripping pockets 114 and thus cause further lowering of the feeder house against the pressure of the counterweight balancing spring 67. The driver of the combine thus drives the receiving bases 38 and 39 into the gripping pockets 114 until the plates 48 of the receiving bases are visible in the openings 123 in the pockets. By means of the pressure cylinder 59, it is now possible to elevate the feeder house until the receiving bases engage completely beneath the two gripping pockets. When the feeder house raises the header, the latter swings about its top positive connections, that is to say about the coupled bases 38 and 39 and pockets 114, in a counterclockwise direction and in this manner the bottom bearing pins 131 swing rearwardly into the gripping recesses of the gripping hooks 49 and 50. When the bearing pins 131 are driven into the gripping recesses, the locking catches 79 are depressed in a counterclockwise direction against the pressure of the springs 83, for which purpose a device which automatically pulls the catch pin 99 out of the stop 98 may be provided on the rod 85 or on the eccentrics 86. In the embodiment illustrated as an example in FIG. 2, the locking catch 79 can be turned by means of the operating knob 96 after the bearing pins 131 have been completely inserted into the gripping recesses 75. The locking catches 79 are held in position through spring pressure and the counterweight 81. After the header has been coupled to the feeder house, it is necessary only to reconnect the operating cable 26, the V-belt 20 et cetera and the combine is again ready for operation.

In the embodiment illustrated in FIG. 9, the device for connecting the header to the feeder house similarly includes pyramidal bases 140 on the feeder house and constructed as connecting elements engageable from below with gripping pockets 141 on the header. Instead of providing separate receiving bases, as at 140 on the feeder house 5, it is of course possible to provide a transversely elongated bar-like receiver which extends over the entire width of the feeder house and which can be connected to a similarly elongated gripping pocket on the header.

In order to obtain a connection between the header and the feeder house which is as far as possible free from vibration and rattling, it is advantageous to provide the carrying units 140 and 141 either in the top or in the bottom region of the respective units and to provide the locking devices in the opposite region. Each locking device includes a coupling element or locking catch 142 disposed in each case on the outside in the bottom region of the feeder house 5. The locking catch 142 is mounted rockably on a horizontal pivot 143 and has a forward gripping hook 145 provided with a guide surface 144 and open at the bottom, and the catch is extended rearwardly and is connected to a linkage arrangement 146 constructed as a remote control device operable from the driver's station 10 to swing the gripping hook 145 from its locking position on uncoupling and to hold it in that position. It is of course also possible for the gripping hook 145 to be operated from the driver's station by other means, such as by a suitable hydraulic device. In the locking position, the locking catch 142 may be biased by a spring (not shown) against a stop 147.

In the coupling operation, the feeder house 5, as previously described, is first alined with the temporarily supported header and the pyramidal bases positioned under and in register with the top connecting elements or pockets 141, and the feeder house is raised to lift the header off the vehicle 95 until the header tips about its top connections 140–141 so that its bottom swings toward the latches 142 and causes pins 148, on the rear of the header, to bear against the guide surfaces 144 of the coupling hooks 145, thereby turning the latter against the pressure of the aforesaid springs.

After the cooperative end faces of the header and feeder house have come into contact with one another, the gripping hooks 145 swing back through the action of the springs against the stops 147 and grip the pins 148 and thus the coupling operation is completed. The gripping hooks 145 can be locked by means of the linkage 146.

Figure 9:
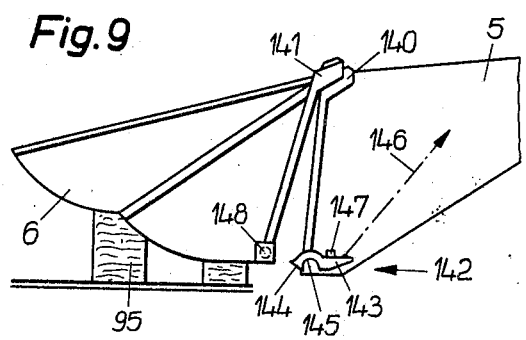
FIG. 9 is a side view like FIG. 1 and illustrates a second example of construction of the means for connecting a header to the feeder house.

The embodiment illustrated in FIGS. 10 and 11 differs from that of FIG. 9 in that, instead of receiving bases 140 and gripping pockets 141, there is provided, as carrying elements or means on the upper part of the feeder house, gripping hook means 150 open at the top and provided with guide surfaces and engageable with transverse coupling means 153 mounted on the header by supports 151 and 152 (FIG. 11). An inclined guide 154 can in each case be connected to the support 151 in order to facilitate the coupling operation.

In order to permit power coupling under unfavorable conditions, as when the mutually facing end faces of the feeder house and header lie at an acute angle to each other, especially when this angle is open at the top, the top coupling element 160 is made adjustable in length. For this purpose, adjustable means, including at least one hydraulic cylinder 161, is pivotally mounted on the feeder house on a support 162 for vertical movement, for example by means of a pull cable 163 extending to the operator's station 10. A piston rod 164 projects forwardly from the cylinder 161 and has a forward, downwardly opening gripping hook 166 provided with a guide surface 165 and with a spring-loaded locking pin 168, the gripping hook being engageable, in the coupling operation, with a coupling element 167 on the header. In the coupling of the header to the feeder house, the bottom coupling devices 148 and 169, respectively at the bottoms of the header and feeder house and constructed as a carrying unit, are first brought into connection and locked. These coupling devices may be constructed, for example, like the bottom couplings 49 and 50 of the embodiment of FIGS. 1–4. Thereupon, the length of the adjustable means is altered by extending or retracting the piston rod 164 so that the gripping hook 166 engages the coupling element 167 and is secured by the locking bolt or pin 168 with the aid of the operating cable 163, and then the header is drawn toward the feeder house 5 by contracting the cylinder 161. In order to prevent lateral displacement of the header in relation to the feeder house 5, corresponding guides 191 may be provided on either the feeder house and/or on the header.

As shown in FIGS. 13–15, according to another embodiment, a coupling operation between the header and the feeder house may be effected under even particularly unfavorable conditions, especially with considerable transverse inclination and lateral offset of the header in relation to the feeder house. Transverse inclination is a characteristic of unevenness of the ground at the site of coupling and by lateral offset is meant the condition when the fore-and-aft centerlines of the header and feeder house are misalined. On its upper side, the feeder house 5 has two laterally swingable, two-way hydraulic cylinders 170, pivotally mounted on bearing pins 171 on the feeder house. The cylinders 170 may be pressurized at either end through hydraulic lines 173 connected to a control unit or valve (not shown) located at the operator's station 10. In order to hold the cylinders 170 as far as possible in their middle positions in the uncoupled condition, spring elements (not shown) may act on opposite sides of the cylinders. Each cylinder has a conical or spherical carrying element 175 on the free end of its piston rod 174, while at least one side of the carrying element 175 may be constructed as a guide. In order to distribute the weight of the header as much as possible in the coupled condition, without introducing bending stresses on the cylinders, lateral and arcuate guide surfaces 176 are rigidly secured to the top portion of the feeder house to support the cylinders during their horizontal swinging as well as when they are straight ahead. In addition, guides 177 for the piston rods 174 and for the carrying elements 175 are provided in laterally spaced relation on the upper part of the feeder house 5. The carrying elements 175 are engageable from below in gripping pockets 179 on the upper rear part of the header structure and are provided with guides 178.

In the bottom part of the feeder house 5 there are provided locking devices 155 (FIG. 14) which have downwardly opening gripping hooks 181 in laterally spaced apart relation, each having guide surfaces 180 and being lockable on horizontal bearing pins 182. The front portion of each gripping hook 181 is laterally swingable on a vertical pin 183 in relation to the feeder house. A remote control device 184, for example a linkage, pull cable or the like, acts on the rear end of the gripping hook 181 and extends to the operator's station 10. The remote control device 184 may be so constructed that it pulls the gripping hook 181 against a stop 185 and thus holds it in the locked position. In order to turn the gripping hook 181 out of its locking position when the pull cable 184 is slackened, it is provided on the feeder house side with a counterweight 186, while it is also possible to turn the coupling hook 181 by means of a spring (not illustrated). The middle position of the gripping hook 181 is obtained, for example, by means of spring elements 187 (FIG. 15). It is for example also possible for the coupling hooks 181 to be connected, like the conical carrying elements 175, to piston rods of hydraulic cylinders.

In the coupling operation, the lowered feeder house 5 is brought as close as possible to the header, which for example is lying obliquely and with lateral offset relative to the feeder house, the top conical carrying elements 175 being thereby contacted by guides 178 provided on the header. Through this guidance of the carrying elements 175, the left-hand cylinder 170, for example, is swung outwardly, thereby first engaging the associated gripping pocket 179 on the header and pushing the header into a normal transverse position so that the right-hand side of the header moves rearwardly or toward the front of the feeder house so that the right-hand element 175 can be contacted by the right-hand guide 178. After both carrying elements 175 have been completely received in the respective pockets 179, the header may still be laterally offset in relation to the feeder house. By retracting the piston rods 164 and the top carrying elements 175 thereon, the elements are respectively centered by the guides 177 into their middle positions and in this manner aline the header fore-and-aft with the feeder house. For locking purposes, horizontal pins 188, over which the gripping hooks 181 engage, are provided on the bottom part of the header structure. The ability of the gripping hooks 181 to swivel laterally to a limited extent about the pivots 183 further facilitates the exact gripping relationship of the pins 188, which may likewise have guides 90. In addition, it is possible for the locking catches to be so disposed that their respective swiveling plane extends in the horizontal plane.

In the embodiment illustrated in FIG. 16, the device for connecting the header to the feeder house comprises a feeder-house-mounted receiving part 192 which is constructed as a connecting element and which is connected by means of bolts at one end to the feeder house and at the other end to the rod 64 of the weight-balancing spring 67 illustrated in FIG. 3. The receiving part 192 is provided with a forwardly directed beak-shaped gripping recess 193, rounded at its upper part 194. A locking catch 197 is pivoted on a pin 195 on the upper part 194 and has a gripping notch 196. The catch 197, the gripping aperture 196 of which points downwardly, is likewise provided with a counter-weight 204 which urges it to turn in a clockwise direction during the coupling operation. The locking catch 197 is held in its locking position by a locking pin which is secured, for example by welding, to a pin 198. The locking catch 197 has a nose 200 which bears against the locking pin 199. The pin 199 is turned by means of an operating lever 201 fixed to the pin 198. A spring may be connected to the pin 198 or to the operating lever 201, which is mounted in the top part 194 for sliding movement transversely and is secured by means of a cross pin or the like, said spring turning said pin upwardly in the counterclockwise direction and thereby pressing the locking pin 199 against the locking catch 197 or against the nose 200. In order to turn the locking catch 197 out of its locking position, the locking pin 199 is displaced transversely by means of the operating lever 201 and thus passes out of the receiving range of the nose 200, so that in consequence of its counterweight 204 the locking catch 197 is turned in a clockwise direction and frees the receiving recess 193 so that it can receive a coupling bolt. The operating lever 201, held by a spring in its position illustrated in the drawing, can be held in the bottom position by a bar 203 mounted slidably on a rib 202, the operating lever 201, or a nose 200 fastened thereto, lying in this position against the forwardly directed side of the bar 203. The bar 203, which can be received in guide slots, can be secured in at least two positions by a cross pin 211.

What is claimed is:

1. In a mobile agricultural machine having a fore-and-aft body including a vertically adjustable forward supporting and crop-feeding unit, a mountable and dismountable front unit ahead of said supporting unit, and coupling structure for selectively connecting and interconnecting said units and including upper and lower means respectively on upper and lower portions of one unit and upper and lower means respectively on upper and lower portions of the other unit and respectively engageable with and disengageable from the upper and lower means on the other unit, characterized in that one means on one unit is mounted on said one unit for relative lateral movement between a normal position of normal engageability with the corresponding means of the other units when the units are normally related for interconnection and a shifted position enabling remote engageability of said one means with said corresponding means when the units are abnormally related prior to interconnection, and means operative to shift said one means, following remote engagement with said corresponding means, back to its normal position to facilitate movement of said units toward their normal relation.

2. The invention defined in claim 1, further characterized in that said one means is movable also fore-and-aft as well as laterally relative to said units.

3. The invention defined in claim 1, further characterized in that the means for moving said one means is power operated.

4. The invention defined in claim 1, further characterized in that the one means is an extensible and contractable hydraulic motor having relatively movable cylinder and piston parts, one of said parts being mounted on the one unit and the other part being movable toward and for engaging said corresponding means and being returnable to facilitate movement of said units toward their normal relation.

5. The invention defined in claim 4, further characterized in that the part mounted on the one unit is pivoted to said one unit for relative lateral swinging.

6. The invention defined in claim 1, further characterized in that said one means includes a pair of laterally spaced coupling elements, the corresponding means on the other unit includes similarly laterally spaced coupling elements respectively engageable with and disengageable from said first-mentioned elements, and each of said first-mentioned elements is mounted on said one unit for relative movement between a normal position of normal engageability with the corresponding element of the other units when the units are normally related for interconnection and a shifted position enabling remote engageability of said engaged elements when the units are abnormally related prior to interconnection, and means operative to shift said first-mentioned elements, following remote engagement with said corresponding elements back to their normal positions to facilitate movement of said units toward their normal relation.

7. The invention defined in claim 6, further characterized in that each first-mentioned element includes a force-exerting device having a pair of relatively movable parts, one of said parts is mounted on said one unit and the other part is extendible and retractable toward and from the corresponding element on the other unit.

8. The invention defined in claim 1, further characterized in that each one part is laterally swingably mounted on said one unit and means is carried by said one unit and engageable with each other part and operative to return the devices to their normal positions upon relative retraction of said parts.

9. The invention defined in claim 7, further characterized in that bearing means is provided on said one unit for sustaining each device against vertical loading.

10. The invention defined in claim 7, further characterized in that each device is a fluid motor and its parts are respectively a cylinder and a piston.

References Cited

UNITED STATES PATENTS

| 2,488,698 | 11/1949 | Acton | 56—21 |
| 3,270,489 | 9/1966 | Rohweder | 56—21 |
| 3,324,637 | 6/1967 | Ashton et al. | 56—2 |
| 3,383,842 | 5/1968 | Prayer et al. | 56—2 |
| 3,431,711 | 3/1969 | Claas | 56—21 |

ANTONIO F. GUIDA, Primary Examiner

U.S. Cl. X.R.

56—21

PO-1050
(5/69)

UNITED STATES PATENT OFFICE
CERTIFICATE OF CORRECTION

Patent No. 3,488,930          Dated  13 January 1970

Inventor(s) Karl-Gunter Gorsler, Joachim Mierswa, Claus-Dieter Heine, Peter Sartorius, and Bernhard Feldmann It is certified that error appears in the above-identified patent and that said Letters Patent are hereby corrected as shown below:

Column 10, line 21, change "1" to -- 7 --.

SIGNED AND
SEALED
JUN 23 1970

(SEAL)
Attest:

Edward M. Fletcher, Jr.
Attesting Officer

WILLIAM E. SCHUYLER, JR.
Commissioner of Patents